United States Patent [19]

Oxley et al.

[11] Patent Number: 4,989,137
[45] Date of Patent: Jan. 29, 1991

[54] COMPUTER MEMORY SYSTEM

[75] Inventors: Donald W. Oxley, Carrollton; Glenn E. Manuel, Dallas; William M. Knight, Jr., Plano; Jeri J. Loafman, Carrollton, all of Tex.

[73] Assignee: Texas Instruments Incorporated, Dallas, Tex.

[21] Appl. No.: 630,476

[22] Filed: Jul. 12, 1984

[51] Int. Cl.⁵ .............................................. G06F 12/06
[52] U.S. Cl. .............................. 364/200; 364/254.3; 364/255.2; 364/256.4; 364/255.7
[58] Field of Search ... 364/200 MS File, 900 MS File.

[56] References Cited

U.S. PATENT DOCUMENTS

| | | | |
|---|---|---|---|
| 4,016,545 | 4/1977 | Lipovski | 364/200 |
| 4,130,870 | 12/1978 | Schneider | 364/200 |
| 4,398,248 | 8/1983 | Hsia et al. | 364/200 |

Primary Examiner—Gareth D. Shaw
Assistant Examiner—Christina M. Eakman
Attorney, Agent, or Firm—L. Joy Griebenow; James T. Comfort; Melvin Sharp

[57] ABSTRACT

A computer memory system for use with a user processor provides automatic memory operations independently of the user processor. The memory system includes a logical memory system which is accessed by the user processor through a binding register unit, enabling the user processor to allocate blocks and specify the length of the blocks. Data within the blocks can also be specified by the user by relative indexing with respect to a block specifier in the binding register unit. The user cannot access the memory directly, but must access the memory through the binding registers. The logical memory system is controlled by a separate memory management unit which manages the physical memory of the system and which manages the memory to have the logical memory system appearance to the user processor.

14 Claims, 4 Drawing Sheets

COMPUTER MEMORY SYSTEM

BACKGROUND OF THE INVENTION

1. Field of the Invention

This invention relates to improvements in memory systems, and more particularly to improvements in a memory system of the type which enable automatic memory operations independently of a user processor with which it is associated.

2. Background Information

The development of storage management systems has a long history with many related branches of research. Over the years, a great deal of attention has been given to the allocation and deallocation of memory structures. Many memory structures to this end are shown by Deitel, H. M., *An Introduction to Operating Systems*, Addison-Wesley, Mass., Chapter 7, 1982. Other major issues are discussed by Knuth, D., *The Art of Computer Programming, Vol. 1: Fundamental Algorithms*, Addison-Wesley, Reading, Mass., 1968. The invention herein described is primarily concerned with heap managed memories which may be garbage collected. Heap managed means that the memory is allocated and freed (either explicitly or implicitly) without regard to the temporal order or the size of the memory unit under consideration. A garbage collected memory is one in which usable memory is automatically reclaimed, and the memory may be reorganized from time to time to efficiently utilize the space of the memory, as needed. A background survey of garbage collection techniques and related background materials is presented by Cohen, J. "Garbage Collection of Linked Data Structures", *Computing Surveys*, Vol. 13, No. 3, Sept. 1981, pp. 341-367, and also by P. Bishop, "Garbage Collection in a Very Large Address Space", Massachusetts Institute of Technology, Working Paper 111, Sept. 1975.

Becoming of interest with the rapid development of artificial intelligence is the development of so-called "knowledge bases", large data bases, for use, for instance, in containing extremely large or complex information stores requiring dynamic organization. See, for example, Suwa, M., et al, "Knowledge Base Mechanisms", *Preliminary Report on Fifth Generation Computer Systems*, ICOT, 1980. Examples of some large data bases under consideration or implemented include, for instance, data bases which contain legal information, such as verbatim case reports, medical information for use in diagnosing possible diseases which present particular symptoms, certain patent information including abstracts, claims, and assignment information, yellow page listings of manufacturers, retailers, wholesalers, and so forth. In such data bases, it is often desirable to search through sometimes millions of words and characters to find the few, if any, occurrences of a particular set of words and characters, then identify a particular record (case, patent, diagnosis, etc.) related to the words and characters.

Presently, particular computer languages such as Lisp, and to a lesser extent, Pascal and Ada, are used to implement such heap allocated data bases (Lisp supporting garbage collected data bases, as well). In such traditional architectures where the memory allocation, de-allocation, garbage collection and compaction are provided, normally the language runtime support and the complier used has the responsibility for the garbage collection and compaction, and if a virtual memory system is provided, it is normally the responsibility of the hardware and operating system to manage the virtual memory system. Typically, for example, the operating system will normally use some type of demand paged LRU scheme for determining how to move pages between main memory and the backing store, and the garbage collector specifies which pages will be needed or which will no longer be needed.

As mentioned, in systems available today, storage is usually managed in the hardware, operating system, language, and data base. There are a large number of techniques in use, which, at best, result in local optimizations, but more often, do not work together symbiotically. These techniques are often difficult for the individual programmer to understand or manage.

Among the key problems often encountered by programmers is the individual word access speed, which is related directly to the speed of the particular memory used. Also, the speed of allocation presents a difficult problem if memory units are not either last-in first-out (LIFO) allocated or of constant size. Also, the time delay between a block of memory becoming available (that is, unreachable by any program) and the time that it is ready for reallocation is a frequently encountered problem. Additionally, the overall size of a virtual memory space is often of concern, since garbage collection costs increase with the size of the space being collected not with the amount of garbage being reclaimed. Finally, security or safety is a significant problem, since normally programs can ignore the actual structure of a memory organization, either intentionally or through inadvertence in program or memory design and blocks of data can easily be overwritten or obliterated entirely.

Reference is also made to copending patent application entitled "COMPUTER SYSTEM ENABLING AUTOMATIC MEMORY OPERATIONS" by Thatte et al, (Docket No. TI-10599) said application being assigned to the assignee hereof and incorporated herein by reference as background. The Thatte et al application describes a computer system having an associated CPU. The system enables automatic memory operations, in general, and the present invention discloses a particular implementation of the general system in which the user CPU can be provided entirely separate from the memory system.

SUMMARY OF THE INVENTION

In light of the above, it is therefore, an object of the invention to provide a memory system which enables automatic memory operations independently of the user processor with which it is associated.

It is another object of the invention to provide a memory system of the type described in which the responsibilities of the user CPU and a memory management unit (MMU) are separate with the CPU having no memory management responsibility; the memory management unit having the ability to freely move data within the memory; both the CPU and MMU being capable of operating separately, independently, and concurrently; and the CPU being constrained against accidently or intentionally destroying the structural information necessary to maintain the organizational integrity of the memory.

It is another object of the invention to provide a memory management system of the type described which is free from particular CPU language implementations and operating systems.

It is another object of the invention to provide a memory management system of the type described which presents a logical address space to the user CPU which enables the CPU to view the memory as being block oriented.

It is still another object of the invention to provide a memory management system of the type described in which blocks of memory carry informational and identifying tags to enable the CPU and MMU to be separate in operation, as above mentioned, and further, selected tag sets which affect the integrity of the memory system are managed strictly by the MMU.

It is yet another object of the invention to provide a memory system of the type described in which blocks of memory can contain pointers which are invisible to the user CPU to indicate memory blocks beyond the block containing the pointer.

It is another object of the invention to provide a memory system of the type described for association with a user CPU which may be external from the memory and of practically any type, and in which the memory is infinitely allocatable in blocks accessible by the user processor only through appropriately configured binding registers.

These and other objects, features, and advantages will become apparent to those skilled in the art from the following detailed description when read in conjunction with the accompanying drawings and appended claims.

The memory system, in accordance with a broad aspect of the invention, presents a memory system which is characterized in that it responds to conditions, commands or instructions from a user CPU to allocate memory blocks and allows the user CPU to execute read, write, move and EQ test instructions with regard to the allocated memory blocks. The memory system operation is based upon the use of binding registers which interface the user CPU to the memory, and which enables the memory to be seen by the user CPU as a block oriented memory, and which permits the memory management unit to control memory overhead functions independently and practically invisibly from the user CPU.

BRIEF DESCRIPTION OF THE DRAWING

The invention is illustrated in the accompanying drawings in which.

In the various figures of the drawing, like reference numerals are used to denote like or similar parts.

DETAILED DESCRIPTION OF THE PREFERRED EMBODIMENTS

Figure 1:
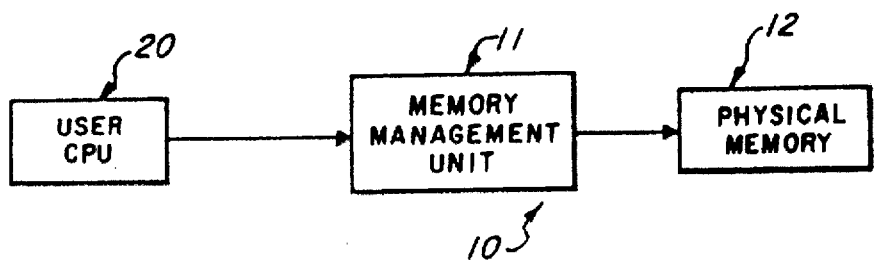
FIG. 1 is a block diagram of the interrelationship of the user CPU, the physical memory and a memory management unit in accordance with the invention.

As shown in FIG. 1, the memory system 10 of the invention includes a memory management unit 11 and physical memory 12, associated with a user CPU 20 (sometimes referred to as the user processor). As will become apparent, unlike previous memory operations, the responsibilities of the user CPU 20 and the memory management unit (MMU) 11 advanced herein are separate. That is, the CPU 20 has no memory management responsibilities, and the MMU 11 can freely move data within the memory. Moreover, the CPU 20 can not accidentally or intentionally destroy or change the structural information of the memory which is necessary to maintain the organizational integrity of the memory. As will become apparent, the user CPU 20 can be practically any type or kind compatible with the memory system 10.

Figure 2:
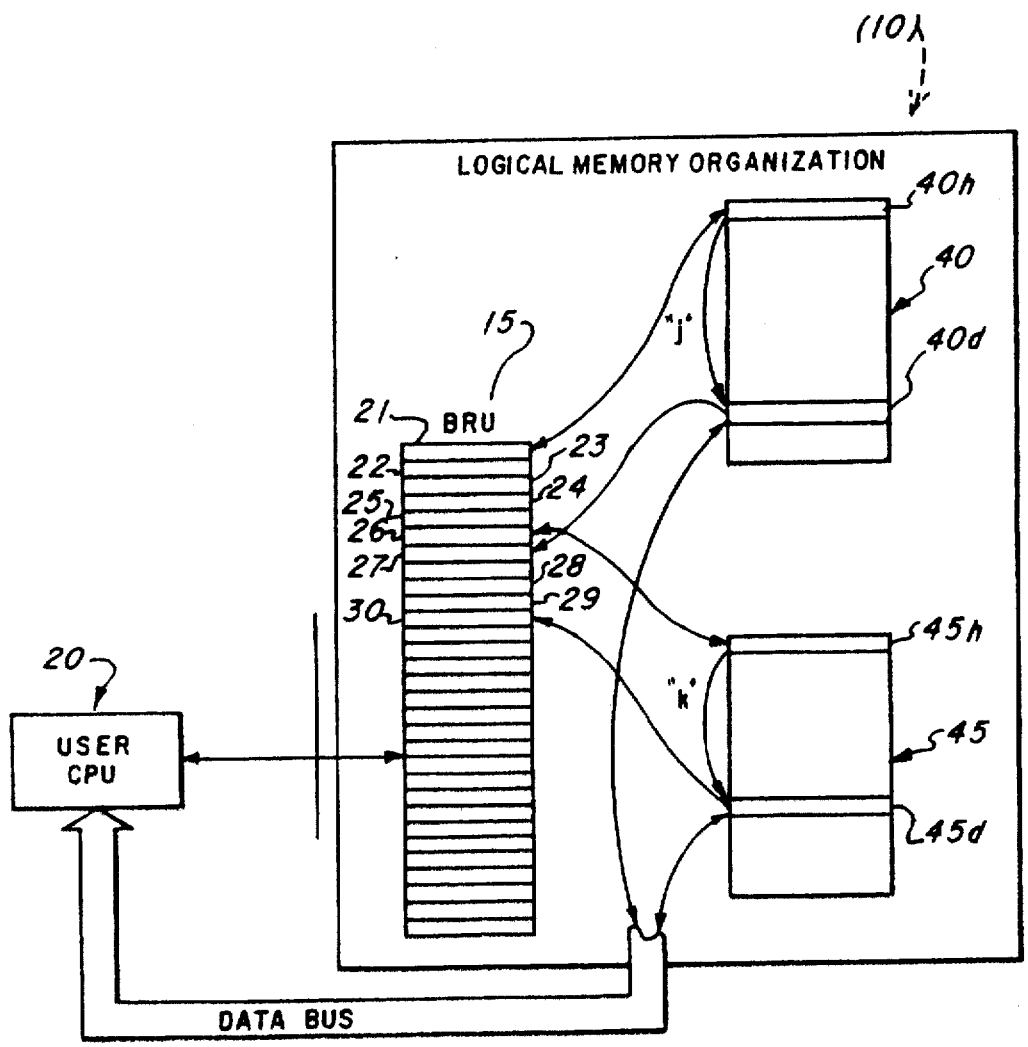
FIG. 2 is a diagram of the memory system in accordance with the invention illustrating its appearance as a logical memory space to a user processor with which it is associated.

The memory system 10 has the appearance to the user CPU 20 of being block oriented. With reference now to FIG. 2, despite the actual or hardware configuration of the memory system 10, it has an apparent logical memory organization (10) as seen by the user CPU 20, as indicated by the reference numeral (10) and its associated dotted arrow. The logical memory organization (10) is referred to herein as a "logical address space", and, as will become apparent, is distinguished from a "virtual address space" which is a memory representation or abstraction as seen by the memory management unit, below described, and from a physical memory, which is the actual physical memory elements of the memory system.

The logical memory system 10 has a binding register unit 15, described below in detail with reference to FIG. 3, which serves as a window or portal into and out of the logical memory system (10). (The binding register unit 15 is a real part of the memory system 10, and is responsible for converting the block oriented view or logical address space seen by the user CPU into the virtual address space in which the memory management actually takes place.) The philosophy of the binding register unit 15 is based upon the notion that at any instant, the user processor 20 can directly address only a limited number of blocks; more specifically, the user processor can directly address those blocks whose pointers are contained in a set of binding registers within the binding register unit 15.

The user CPU 20 typically uses the binding register unit 15 in two modes of operation. Thus, the binding register 15 may be loaded with a block identifier (i.e. a pointer to a block) in order to establish the addressability of a particular block in memory. This is referred to as a "binding" of a specific binding register to the block whose addressability is being established. The term "binding" is used to emphasize the association of the register with the block. The term "pointer" is used to denote a value or data which specifies an address of a particular block of memory. As will become apparent, there are certain constrains upon the source of block identifiers which can be contained in a binding register. Except for an initializing bootstrapped address, the only source of block addresses or pointers is from a previously bound block or another binding register.

The other primary mode of operation of the binding register 15 is as a base for referencing some value within a previously bound block. For example, in response to a CPU request for the data in a specified relative block location, the MMU develops an address for the particular value to be found or contained within the block by adding an index count to the contents of the block address field contained in the binding register. It will be appreciated that it is necessary to verify that the index is a valid one for the particular block, for example, that the index does not specify the fourth word of a two word block. The binding register unit supports this type of addressing as a relative index to a register name which is currently bound to a block. It therefore provides complete checking to see that the index is valid before permitting the reference.

More specifically, the binding register unit 15 includes a number or set of individual binding registers 21, 22, . . . 30, each of which being addressable and manipulatable by the user CPU 20. The manner by which the user CPU addresses the binding registers can be, for example, merely by specifying a particular binding register, such as "register 1", "register 5", and so on. The binding register unit 15 may have as many binding registers as needed for the particular application of the memory management unit under consideration.

Within the meory system 10 is a large physical memory (below described in detail) from which memory blocks can be allocated. For example, in the diagram of FIG. 2, two memory blocks 40 and 45 have been established by appropriate commands from the user CPU (below described). Each of the blocks which are established includes a header portion 40h and 45h, at least a portion of which is reproduced into one of the binding registers 20-30 of the binding register unit 15. The header of each respective block may contain, among other things, block identifying data, block length data, block type data, flags, and the like.

Additionally contained in each block 40 and 45 are data words 40d and 45d, respectively. The data words 40d and 45d are displaced from the respective headers of the blocks 40 and 45 by a number of address locations. The number of address locations depends on many factors, including the specification of a particular address displacement by the user CPU. More particularly, the user CPU can write data into the block 40 at location 40d by specifying a displacement from the header, contained, for instance, in register 21 of the binding register unit 15. The manner by which the user CPU specifies the desired block location is by specifying the particular binding register to which the block is bound (for instance, "register i") and the displacement within the bound block (for instance, "j"). The specified value can then be returned directly to the user CPU as data, or can be written into the binding register unit in (the same or different) specified binding register.

Thus, by way of example, and as will become even more apparent, the user CPU 20 may issue a command to the memory system (10) to create a block, for instance the block illustrated which is denoted by the reference numeral 40, of some specified length. In so doing, the CPU issues a direction to the MMU to place a pointer to the block 40 in a CPU directed target binding register, such as register 21. Thereafter, the CPU 20 might issue a command to write data into the block 40 by specifying a displacement "j" from the address of the header pointed to by the pointer in binding register 21. It should be emphasized that the CPU 10 only specifies the particular binding register (21) containing the pointer and the displacement "j", not the address of the block 40.

The binding register of the binding register unit 15 and the manner by which blocks are bound to it are described in greater detail with reference now to FIG. 3. Each binding register has two parts, denoted Part "a" and Part "b". Each of the parts a-b contains certain block identifying information, as below described in detail. In the establishment or binding of a block within the binding register unit, as mentioned above, a particular block location or address is referenced by the use CPU by a relative index. As shown in FIG. 3 in this particular example, the particular location referenced is a cell denoted by Pc in a previously bound referencing block 45 at a displacement "i" from the header 45h. This cell, Pc, has two segments, the first segment 64 for a memory management unit tag, and the second segment 71 for either a pointer to the header of a referenced block or for data. (In either case, the contents of segment 71 appear as "data" to an observer.) The MMU tag 64 indicates whether or not the "data" is in fact a pointer. Thus, in this example, the "data" word in the segment 71 of the Pc cell is or contains the pointer reference to the header information 40h of the next subsequent block (block 40) to be bound to the binding register unit. The information in the first and second registers of the header 40h is then copied to registers Part "a" and Part "b" in the manner described below, thereby completing the binding process. Additional information not of interest herein may also be contained in the header portion 40h.

With reference once again to Part "a" of the binding register, two pieces of information of interest are given, namely a memory management unit tag 62 and a memory size segment 68. Part "b" of the binding register also has two segments of interest. The first segment 63 is for a memory management unit tag 63 and a second segment 69 is for certain flags. The flags in the flag portion 70 of register Part "b" of the binding register may contain numerous flags, examples of which are "lock", "bound", and so on. A lock flag may be used, for example, in the establishment or moving of the block during which time any addressing of the block by other than the memory management unit is prohibited. A bound flag may be, for example, used to indicate that the block is bound to a binding register.

Figure 3:
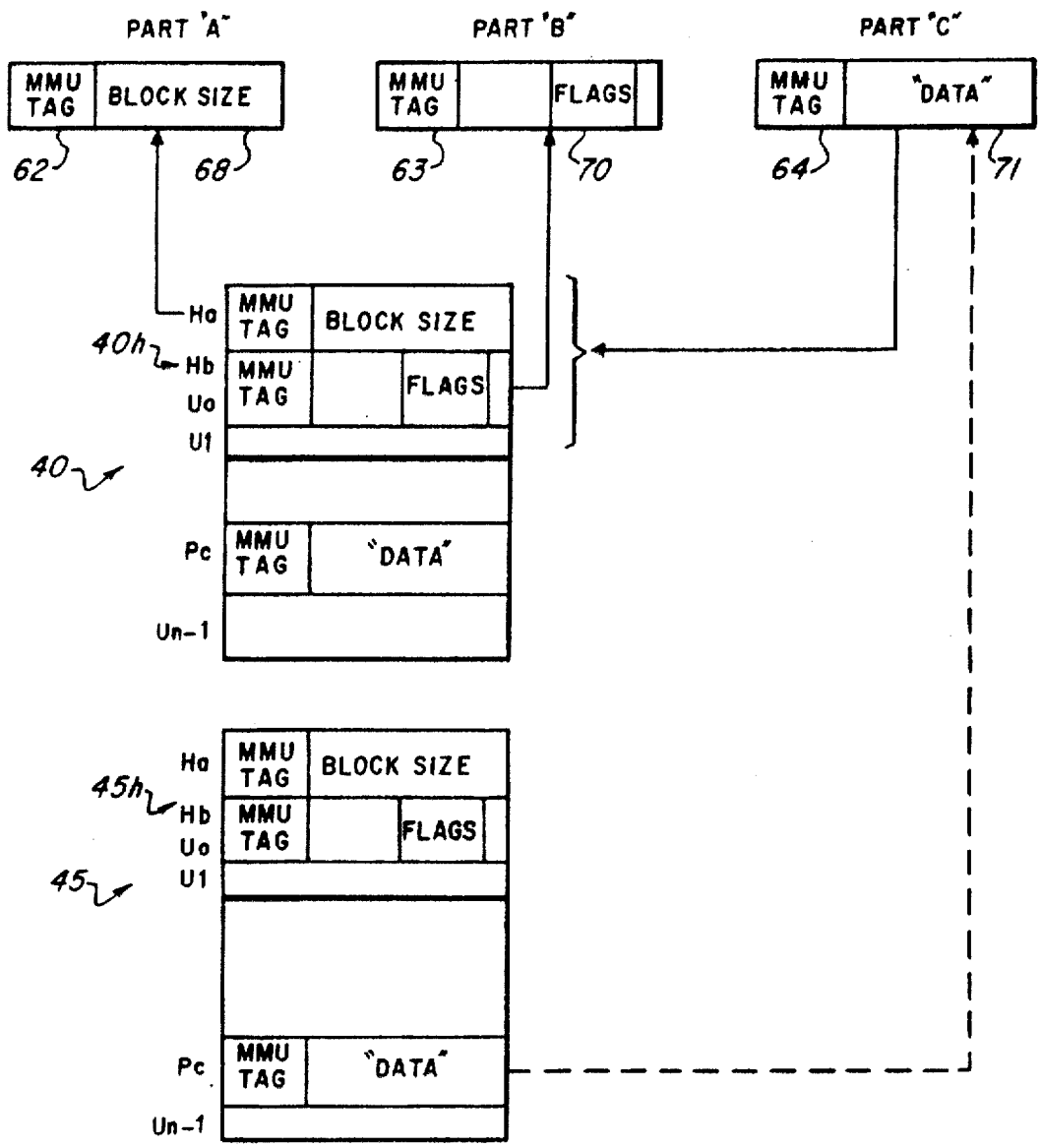
FIG. 3 is a box diagram of a binding register configuration for use in a memory management unit in accomplishing a preferred embodiment of the memory system of the invention.
Figure 4:
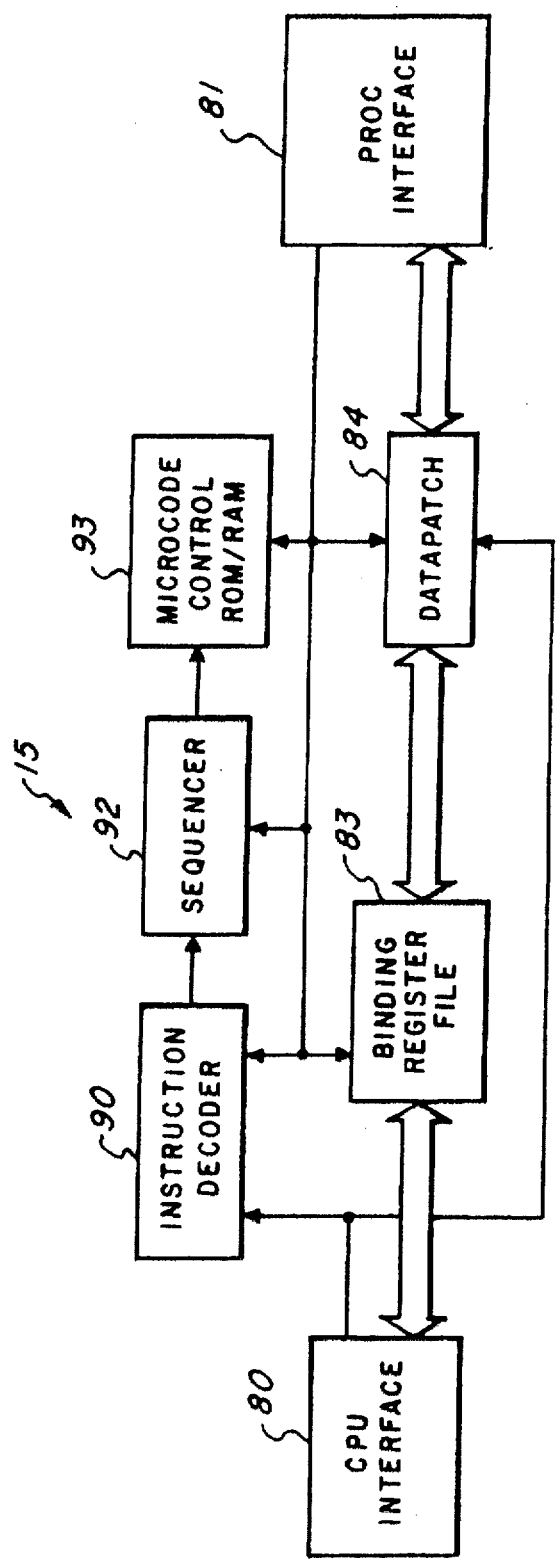
FIG. 4 is a box diagram of a binding register unit for use in accomplishing the memory system, in accordance with the invention.

To accomplish the binding register unit which enables the logical memory organization of FIGS. 2 and 3, hardware arranged in the manner illustrated in FIG. 4 can be employed. The hardware for realizing a binding register unit 15 in accordance with the invention includes a CPU interface 80 for connection between the user CPU 20 (FIG. 1) and the binding register unit 15, on the one hand, and a processor interface 81 for connection between a memory management unit controlling processor (FIG. 5, described below) and the binding register unit 15. The binding register unit 15 includes a binding register file 83 for containing individual binding registers into which information is written, as above described. The binding register file 83 is connected directly to the CPU interface 80. In addition, the binding register file 83 is connected to the processor interface 81 by a data path controlling circuit 84.

Additionally, an instruction decoder 90 is provided, with connection to the CPU interface 80 to receive instructions from the user processor, and to operate to decode the particular instructions issued by the user CPU. The output from the instruction decoder 90 is directed to a sequencer 92 and a microcode generator or control ROM/RAM 93. The microcode generator or control ROM/RAM 93, in conjunction with the MMU processor, controls the operation of the binding register file 83 and the data path selection circuit 84.

As will be apparent, the circuitry for the binding register unit 15 can be fabricated in standard TTL or MSI circuitry or on a custom LSI or VLSI chip using well known techniques. As said above, the operation of the binding register 15 to effect the memory architecture described, is under the control of the microcode control program in the microcode ROM/RAM 93. The design of the microcode will depend upon such factors as the type of memory processor employed (described below), the type of hardware for construction of the memory system, and so on. By way of example, and for the sake of completeness, a LISP program which can be run on a standard LISP machine to simulate the operation of the memory system of the invention, including the binding register unit, is shown in Appendix A attached hereto. It will be understood that various other forms of implementation of the memory system can be equally advantageously employed.

Figure 5:
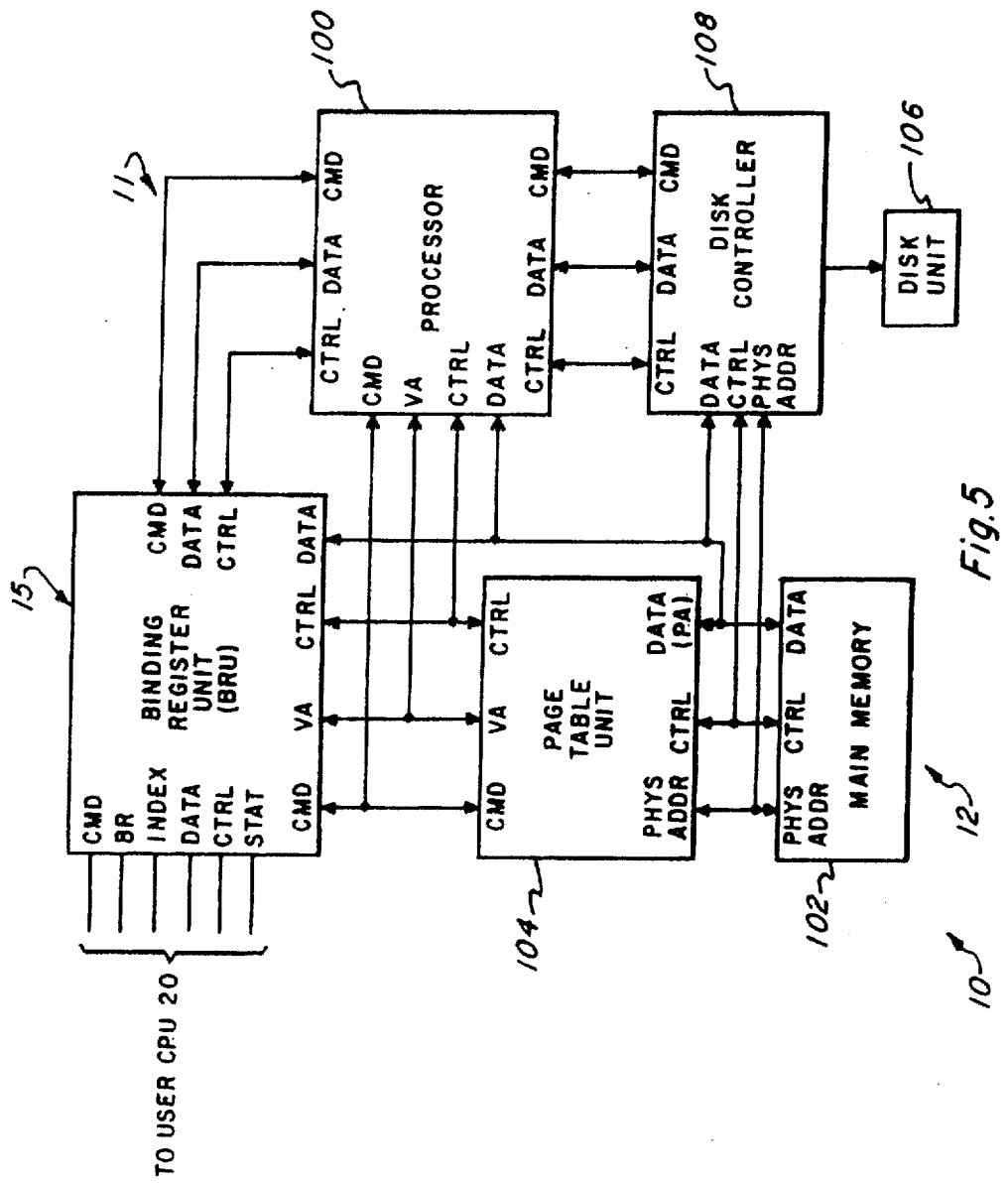
FIG. 5 is a box diagram of a generalized hardware implementation of the memory system, in accordance with the invention.

The hardware for realizing the memory management unit 11 in conjunction with the physical memory 12 to form the memory system 10 of the invention is quite general, and is shown in FIG. 5. As illustrated, the memory system 10 includes a binding register unit 15, as above described, connected to the user CPU 20 (see FIG. 1). As shown, command, binding register, index, data, control and status lines are provided to the user CPU 20 from the binding register unit 15 as above described. The operation of the memory management unit 11 is controlled by a processor 100, to which command, virtual address, control and data lines are provided for connection to the binding register unit 15, as shown. Depending upon the particular type of physical memory in conjunction with which the memory system of the invention is to be operated, various memory interfacing apparatuses can be provided for control by the processor 100. Thus, as shown, a main memory 102 is provided which may include, for instance, a hard wired physical memory of semiconductors, bubble domain cells, or any other memory elements known in the art. The main memory 102 is connected to the binding register unit 15 by a page table unit 104. The data flow between the binding register unit 15 and physical memory 102 is controlled through the page table unit 104 by the processor 100, or the binding register unit 15, having command, virtual address, control and data lines connected between the binding register unit 15, the processor 100 and page table unit 104. In addition, a disk unit 106 may be provided as a form of memory with which the memory management unit 11 in accordance with the invention may be used. The disk unit 106 can be of any magnetic disk, optical, or other well known disk memory, as known in the art. The disk unit 106 is controlled by a disk controller 108, again controlled by the processor 100 by control, data, and command lines, and interfaces with the binding register unit 15 and page table unit 104 by data, control and physical address lines, as shown, for data transfers.

It should be noted that although a physical main memory 102 and disk unit 106 are shown, it is not intended that the invention be limited in any way to such memory types, as it will be apparent to those skilled in the art that other memory types and configurations can be equally advantageously employed in practicing the invention.

In the operation of the binding register unit, as has been mentioned, one or more flags are provided in the block header. At least one of the flags serves as a lock so that, when set, no changes can be made by the user CPU to the block. This is useful, for example, when the block is being copied, moved, rearranged, and the like, for instance during garbage collection or other action being performed by the memory management unit.

Another flag which may be employed is to determine whether the block is bound or not. Thus, when the memory system wishes to move or modify a block, it must be able to determine if the block is currently bound to a binding register.

In addition, the block size indication in register portion 68 of Part "a" of the binding register is necessary to determine whether an index exceeds the valid length of the block.

The MMU tags in segments 62, 63 and 64 are associated with both the header and the data portions of the block. The tags required by the memory management unit are enforced by the binding register unit so that the user processor is prevented from writing a tag or "pointer" and also to verify that a cell actually contains a pointer before attempting to bind a particular block. It should be noted that in a tagged memory of the type described herein, the tags cannot be arbitrarily set by the user processor. Thus, the memory management unit must continually verify that the user processor is not attempting to set prohibited tags, that is, pointers, headers, forwards, and so on. Thus, since each pointer carries an MMU tag indicating that the data represents a pointer, the pointers within the blocks may not be modified by the user processor. The user processor can, however, over-write the pointer with data, which would result in the destruction of the pointer reference, but is prohibited from direct alteration or modification of the pointer.

With the memory system configured in the manner thus described, the memory system is addressable or accessible in the logical address space by a number of predetermined commands. Among the commands which can be used are (1) a command to allocate block space; (2) a command to copy a pointer from one binding register or indexed block cell to another binding register or block cell within the logical address space; (3) a command to perform an "EQ test" which tests two binding registers or block cells in the logical address space to determine whether they both (a) contain pointers which refer to the same block or (b) contain the same data; (4) a command to read an indexed location in a specified block; and (5) a command to write user processor generated data into an indexed location in a specified block. It will be appreciated that the allocate command, copy instruction and the "EQ Test" serve to enable the user processor to determine the configuration of the memory system and to arrange the memory system to any desired configuration. The read and write commands allow the processor to interact with the memory. Even so, it should be noted that the user processor is not permitted to write pointers into the logical address space. Although other commands can be equally advantageously employed, as will be apparent to those skilled in the art, the above enumerated commands are presently considered to be minimally required of the memory system of the invention; that is, it is considered that the five commands enable the operation of the memory system, and distinguish it from memory systems of the prior art. It will be apparent to those skilled in the art that other additional commands can easily be implemented with the memory system thus described, many of which can be accomplished through various combinations of the specified above commands. General operation of the memory system will now be described. The memory system 10 is first associated with a user processor 20. The user processor 20 can be of any kind or type, so long as it is able to communicate with the binding register unit 15. The restriction is merely a hardware compatibility restriction, it has nothing to do with the operation of the memory, its hierarchy, its organization, etc.

When the user processor wishes to write into memory, it first issues a block allocate command to the memory management system 10. As a part of the block allocate command, the user processor specifies the size of the block desired and a binding register to which the block to be allocated or created is bound. The memory system then creates the requested block. The user processor 20 may then issue a write command directed to the specified binding register, and stating a relative block location at which the processor desires that data be written. Thereafter, if it is desired to read the data previously written, the processor 20 issues a read statement directed to the binding register to which the block is bound at that time specifying the offset at which the data was previously written. The memory management system then delivers to the user processor the previously written data.

One aspect of the operation of the memory system 10 includes the formulation and operation of the pointer system within the allocated blocks. Thus, for instance, if it is desired to reference one block from another, a pointer may be established at a relative address in the referencing block to the reference block. The pointer would be established by the memory management unit 11, not by the user processor, and would be located at an indexed relative location in the referencing block. (The user processor may request the MMU to establish a pointer, but the MMU itself creates and manages the pointers.) If desired, the user processor can issue an EQ test command to the memory system 10 to determine whether two relative locations in a particular block or in two blocks contain pointers to the same block. (The EQ test can also be used to determine whether two particular relative locations of the same or different block contain the same data). It should be noted that although the relative locations of the allocated blocks can be read directly by the user processor, if the relative locations contain pointers to other blocks, the pointers read may not necessarily be the same even though they may be declared equal upon execution by the EQ test. For example, a block may contain an invisible pointer which would result in an apparent different reference.

For instance, if a pointer of say block A points to block B, and a pointer of block C points to block D which in turn points to block B, the pointers of blocks A and C would point to the same block and would therefore be declared equal by the EQ test, but would not appear to be equal if viewed by the user processor as data.

Finally, if the user CPU has completed all operations regarding a particular block, the user processor may issue a deallocate command to the memory management unit 11 requesting that the block be destroyed. With the memory management unit 10 thus configured, it will be appreciated that many operations which heretofore were necessarily conducted by the user processor, the compiler, assembler, or such, can now be automatically performed or implemented. Notably, garbage collection can be implemented automatically, without a requirement that the ongoing processing steps of the user processor be halted during the garbage collection process. The garbage collection techniques can be generally any techniques which have been heretofore used, examples of which are shown in an article by G. Baker, Jr., "List Processing in Real Time on a Serial Computer", *Communications of the ACM*, Vol. 21, No. 4. Apr. 1978. Inasmuch as the garbage collection within the memory unit 10 is invisible to the user CPU, and independent of it, the garbage collection techniques used can, in fact, efficiently be compacting garbage collection techniques, enabling even more efficient use of the physical memory of the memory management unit 10.

Additionally, since the length of each block which is allocated is known and cannot be exceeded in use, the memory is protected from accidental or intentional destruction by the user, for instance, by an attempt to write data or other matter into one block at an index beyond the length of the block.

It should also be noted that although the memory system in accordance with the invention has been described in terms of a particular hardware implementation, other implementations will be apparent to those skilled in the art. Furthermore, the memory can be implemented in other ways, for example, in software by PASCAL or other software implementation.

Finally, it should be noted that there are no requirements of or on a physical backing store provided that sufficient primary memory is present.

Although the invention has been described and illustrated with a certain degree of particularity, it is understood that the present disclosure has been made by way of example only and that numerous changes in the combination and arrangement of parts may be resorted to by those skilled in the art without departing from the spirit and scope of the invention as hereinafter claimed.

```
; This is a flavor-system based simulator of the "logical" Memory Management Unit
; (MMU) simulator of the Artificial Intelligence Engine (AIE).
; The simulator is written in the flavor-system of Zetalisp language of the
; Symbolics-3600 host machine.
; It only simulates the logical abstraction of the MMU. Neither reference count
; management nor garbage collection are simulated, as the garbage is collected
; by the host machine.
; Defines a memory cell as a flavor. Its instance variables are
; the cpu-tag, mmu-tag and data (defflavor cell ((cpu-tag 'cpu-tag)
                 (mmu-tag 'status)
                 (data 0))
                ()
                :gettable-instance-variables
                :settable-instance-variables
                :initable-instance-variables)
```

```
; Defines an individual binding register as a flavor.

(defflavor binding-reg ((flag 'empty)
                        (data nil)
                        (block-size 0)
                        (ref-count 0))
           ()
           :gettable-instance-variables
           :settable-instance-variables
           :initable-instance-variables)

; The Binding Register Unit (BRU) is defined as a flavor. Its instance
; variables are the binding-reg-array, instruction decoder, and statistics
; accumulator. The binding-reg-array is an array of 32 instances of the
; binding-reg flavor.

(defflavor BRU ((binding-reg-array (make-array 32
                                               ':type 'art-q))
                statistics-accumulator)
           ()
           :gettable-instance-variables
           :settable-instance-variables
           :initable-instance-variables)

; The methods for the BRU flavor are defined below.
; The first BRU method creates the binding register array.
; This method is expected to be called only once.

(defmethod (BRU :create-binding-reg-array) ()
  (do i 0 (1+ i) (= i 32)   ; iterate over the range of all binding registers
    (aset (make-instance 'binding-reg) binding-reg-array i)))

; The second BRU method is "Execute-instruction." It simulates the MMU commands given by the CPU.

(defmethod (BRU :execute-instruction) (mmu-instruction)
```

APPENDIX A
page A-1

```
(selectq (first mmu-instruction)   ;dispatch on mmu-instruction opcode (read-reg  (if (neq (funcall (aref binding-reg-array (second mmu-instruction))
                              ':flag) 'empty)
                 (funcall (aref binding-reg-array (second mmu-instruction))
                          ':data)
                 '(Error - attempted to read empty binding register)))

(write-reg (progn
               (funcall (aref binding-reg-array (second mmu-instruction))
                        ':set-data (third mmu-instruction))
               (funcall (aref binding-reg-array (second mmu-instruction))
                        ':set-flag 'data-only)))

(read-cell (if (and
                   (eq (funcall (aref binding-reg-array (second mmu-instruction))
                                ':flag) 'bound)
                   (<= (third mmu-instruction)
                       (funcall (aref binding-reg-array (second mmu-instruction))
                                ':block-size)))
                 (progn
                   (funcall (aref (funcall
                                    (aref binding-reg-array (second mmu-instruction))
                                    ':data) (1- (third mmu-instruction)))
                            ':data)

(funcall (aref (funcall
                                    (aref binding-reg-array (second mmu-instruction))
                                    ':data) (1- (third mmu-instruction)))
                            ':cpu-tag))

'(Error - Tried to access an unbound block or beyond block
                           boundary)))

(write-cell (if (and
                    (eq (funcall (aref binding-reg-array (second mmu-instruction))
                                 ':flag) 'bound)
                    (<= (third mmu-instruction)
                        (funcall (aref binding-reg-array (second mmu-instruction))
                                 ':block-size)))
                  (progn
                    (funcall (aref (funcall
                                     (aref binding-reg-array (second mmu-instruction))
                                     ':data) (1- (third mmu-instruction)))
                             ':set-data (fourth mmu-instruction))
```

```
            (funcall (aref (funcall
                            (aref binding-reg-array (second mmu-instruction))
                            ':data) (1- (third mmu-instruction)))
                ':set-mmu-tag 'data))

'(Error - Tried to access an unbound block or beyond block
            boundary))))

(reg-to-reg (if (neq (funcall (aref binding-reg-array (second mmu-instruction))
                        ':flag) 'empty)
            (prog1
                (aset (aref binding-reg-array (second mmu-instruction))
```

APPENDIX A
page A-2

```
                binding-reg-array (third mmu-instruction))
            '(done))
        '(Error - attempted to copy empty binding register)))

(reg-to-cell (cond
            ((eq (funcall (aref binding-reg-array (second mmu-instruction))
                    ':flag) 'empty)
                '(Error - attempted to copy empty binding register))

((neq (funcall (aref binding-reg-array (third mmu-instruction))
                    ':flag) 'bound)
                '(Error - attempted to write into an unbound block))

((> (fourth mmu-instruction)
                (funcall (aref binding-reg-array (third mmu-instruction))
                    ':block-size))
                '(Error - attempted to write beyond block limit))
            (t
             (prog1
                (funcall (aref (funcall
                                (aref binding-reg-array (third mmu-instruction))
                                ':data) (1- (fourth mmu-instruction)))
                    ':set-data (funcall
                                (aref binding-reg-array (second mmu-instruction))
                    ':data))
                '(done)))))

(cell-to-reg (cond
            ((eq (funcall (aref binding-reg-array (second mmu-instruction))
                    ':flag) 'empty)
                '(Error - attempted to read from unbound block))

((> (third mmu-instruction)
                (funcall (aref binding-reg-array (second mmu-instruction))
                    ':block-size))
                '(Error - attempted to read beyond block limit))

(t
             (prog1
                (funcall (aref binding-reg-array (1- (fourth mmu-instruction)))
                    ':set-data
                    (funcall (aref
                                (funcall (aref binding-reg-array
                                            (second mmu-instruction)) ':data)
                                (1- (third mmu-instruction))) ':data))
                '(done)))))

(cell-to-cell (cond
            ((eq (funcall (aref binding-reg-array (second mmu-instruction))
                    ':flag) 'empty)
                '(Error - attempted to read from unbound block))

((> (third mmu-instruction)
                (funcall (aref binding-reg-array (second mmu-instruction))
                    ':block-size))
                '(Error - attempted to read beyond block limit))

((eq (funcall (aref binding-reg-array (fourth mmu-instruction))
                    ':flag) 'empty)
```

APPENDIX A
page A-3

```
                '(Error - attempted to write to unbound block))

((> (fifth mmu-instruction)
                (funcall (aref binding-reg-array (fourth mmu-instruction))
                    ':block-size))
                '(Error - attempted to write beyond block limit))
```

```
          (t
            (prog1
              (funcall (aref
                          (funcall (aref binding-reg-array
                                         (fourth mmu-instruction)) ':data)
                          (1- (fifth mmu-instruction))) ':set-data
              (funcall (aref
                          (funcall (aref binding-reg-array
                                         (second mmu-instruction)) ':data)
                          (1- (third mmu-instruction))) ':data))
              '(done)))))

(allocate (prog1
               (funcall (aref binding-reg-array (second mmu-instruction))
                  ':set-data (make-array (third mmu-instruction)
                              ':leader-length 3
                              ':leader-list (list 0 'initialized
                                               (third mmu-instruction))
                              ':type 'art-q))
               (funcall (aref binding-reg-array (second mmu-instruction))
                  ':set-flag 'bound)
               (funcall (aref binding-reg-array (second mmu-instruction))
                  ':set-block-size (third mmu-instruction))
               (funcall (aref binding-reg-array (second mmu-instruction))
                  ':set-ref-count 0)

(do i 0 (1+ i) (= i (third mmu-instruction))
                  (aset (make-instance 'cell)
                        (funcall (aref binding-reg-array (second mmu-instruction)) ':data)
                        i))))

(otherwise '(illegal mmu-instruction))))

; Defines the MMU-BRU by making an instance of the flavor BRU (setq mmu-bru (make-instance 'BRU))

; Creates the binding-reg-array with 32 instances of binding register flavor as
; elements (funcall mmu-bru ':create-binding-reg-array)

; A test function "f1-1" consisting of 12 MMU instructions (defun f1-1 ()
  (funcall mmu-bru ':execute-instruction '(allocate 1 10))
  (funcall mmu-bru ':execute-instruction '(allocate 2 100))
  (funcall mmu-bru ':execute-instruction '(write-cell 1 10 fun))
  (funcall mmu-bru ':execute-instruction '(reg-to-reg 1 3))
  (funcall mmu-bru ':execute-instruction '(reg-to-cell 1 2 100))
```

<div align="right">APPENDIX A<br>page A-4</div>

```
  (funcall mmu-bru ':execute-instruction '(cell-to-reg 2 100 4))
  (funcall mmu-bru ':execute-instruction '(read-cell 4 10))
  (funcall mmu-bru ':execute-instruction '(cell-to-cell 2 100 4 1))
  (funcall mmu-bru ':execute-instruction '(read-cell 4 1))
  (funcall mmu-bru ':execute-instruction '(allocate 5 16))
  (funcall mmu-bru ':execute-instruction '(write-cell 5 1 not-fun))
  (funcall mmu-bru ':execute-instruction '(read-cell 5 1)))

; A test function "f1-100" consisting of 100 repetitions of f1-1
; thus, simualting 1200 MMU instructions (defun f1-100 ()
  (do i 0 (1+ i) (= i 100)
    (f1-1)))

; A test function "f1-1000" consisting of 1000 repetitions of f1-1
; thus, simualting 12000 MMU instructions (defun f1-1000 ()
  (do i 0 (1+ i) (= i 1000)
    (f1-1)))
```

<div align="right">APPENDIX A<br>page A-5</div>

What is claimed is:

1. A memory system for association with a user processor, comprising:
   a physical memory;
   and means for interfacing the physical memory to the user processor so that the physical memory appears to the user processor as a binding register by which blocks of length arbitrarily allocatible by the user processor must be accessed for reading and writing information by the user processor, wherein the user processor communicates with the memory blocks by specifying a register of the binding register to identify an associated block and a relative index to a location within the block.

2. The memory system of claim 1 further comprising means for allocating logical address space representing said physical memory, for determining if one pointer within the logical address space points to the same place in the logical address space as another pointer, and for copying a pointer from one location in the logical address space to another location.

3. The memory system of claim 2 further comprising means for enabling the user processor to write user provided data into the allocated logical address space and to read information from the logical address space.

4. The memory system of claim 3 wherein said means for interfacing comprises a binding register addressable by said user processor and operationally connected to the logical address space.

5. The memory system of claim 4 comprising means for enabling said user processor to allocate logical blocks of memory of specified, arbitrary length, and associating such blocks with binding registers.

6. The memory system of claim 5 further comprising means for insuring that the user processor cannot write pointer information into the allocated logical address space.

7. A memory system for use with a user processor comprising:
   a physical memory;
   a binding register unit having a plurality of registers accessible to the user processor to contain only identifiers for blocks of memory and data, and for enabling relative location indexing by the user processor for data manipulation;
   and means independent from the user processor for managing the physical memory and binding register, whereby the memory system has the appearance to the user processor of a collection of user specified blocks accessible only through the binding register unit.

8. A memory system for use with a user processor comprising:
   a binding register unit to interface said memory system to a user processor;
   means for creating a logical memory organization accessible by said user processor only through said binding register;
   and means responsive to said user processor in said logical memory organization for creating blocks of length specified by said user processor, for reading and writing information into and from relative locations within said created blocks, for testing any two relative locations within said created blocks to determine if the locations have equal contents, and moving information from one relative location to another within said created blocks.

9. A memory system for use with a user processor comprising:
   a physical memory;
   a binding register providing access from said user processor to said memory system;
   a memory management unit including:
   means for allocating said physical memory into blocks in response to commands from said user processor through said binding register;
   means for establishing block identification data associated with said blocks;
   means for establishing pointers within said blocks to identify other blocks;
   and means for preventing said user processor from altering said pointers.

10. The memory system of claim 9 wherein said means for establishing block identification data associated with said block comprises:
    means for identifying a pointer referencing a block to be bound;
    means for creating a block header in said block to be bound; and
    means for duplicating said block header into said binding register;
    whereby said binding register contains a two segment block identifier of the block to be bound.

11. The memory system of claim 9 further comprising:
    means for establishing at least a lock flag associated with each of said blocks for preventing reference to said associated block by said user processor when set.

12. The memory system of claim 11 further comprising:
    at least a "bound" flag, which, when set, provides an indication that said block is bound to said binding register.

13. The memory system of claim 9 wherein said means for allocating physical memory into blocks further comprises:
    means for binding said allocated blocks within said binding register by providing at least a block identifier within said binding register.

14. The memory system of claim 13 wherein said means for binding further comprises:
    means for providing an indication of allocated block size in said binding register.

* * * * *